United States Patent
Klein et al.

(10) Patent No.: US 11,712,938 B1
(45) Date of Patent: Aug. 1, 2023

(54) PISTONLESS PNEUMATIC DAMPENING AND STRAIGHT CENTERING FOR A STEERABLE AXLE OF A HEAVY-DUTY VEHICLE

(71) Applicants: Jason M. Klein, Springfield, MO (US); Kevin C. Schlack, Nixa, MO (US)

(72) Inventors: Jason M. Klein, Springfield, MO (US); Kevin C. Schlack, Nixa, MO (US)

( * ) Notice: Subject to any disclaimer, the term of this patent is extended or adjusted under 35 U.S.C. 154(b) by 225 days.

(21) Appl. No.: 17/190,926

(22) Filed: Mar. 3, 2021

Related U.S. Application Data

(60) Provisional application No. 62/984,408, filed on Mar. 3, 2020.

(51) Int. Cl.
*B60G 11/27* (2006.01)
*B60G 9/00* (2006.01)
*B62D 7/14* (2006.01)

(52) U.S. Cl.
CPC ............... *B60G 11/27* (2013.01); *B60G 9/00* (2013.01); *B62D 7/144* (2013.01); *B60G 2200/44* (2013.01); *B60G 2202/152* (2013.01); *B60G 2202/412* (2013.01); *B60G 2204/126* (2013.01)

(58) Field of Classification Search
CPC ........ B60G 2202/412; B60G 2202/152; B60G 2200/44; B60G 2204/126; B60G 9/00; B60G 11/27
USPC .................. 280/86.5, 5.514, 6.157, 124.157
See application file for complete search history.

(56) References Cited

U.S. PATENT DOCUMENTS

| 1,273,059 | A | | 7/1918 | Hild | F16F 9/20 |
|---|---|---|---|---|---|
| 3,716,249 | A | | 2/1973 | Schaeff | B62D 13/00 |
| 3,880,439 | A | | 4/1975 | Wolter | B62D 13/04 |
| 5,230,528 | A | | 7/1993 | Van Raden et al. | B62D 61/12 |
| 5,620,194 | A | | 4/1997 | Keeler et al. | B62D 61/12 |
| 6,007,078 | A | * | 12/1999 | Gottschalk | B62D 17/00 280/81.6 |
| 6,062,578 | A | | 5/2000 | Richardson | B60G 11/28 |
| 6,182,984 | B1 | * | 2/2001 | Chalin | B62D 13/06 280/86.751 |

(Continued)

OTHER PUBLICATIONS

Li, Xiangbi et al., "Parameter Optimization on Asymmetry Orifice in a Differential Surge Chamber," Energy Procedia 16 (2012) 730-736, accessed online at https://www.researchgate.net/figure/a-symmetric-orifice-b-asymmetric-orifice-hydraulic-resistance-coefficient-under-ideal_fig3_257711565, on Jul. 1, 2021.

(Continued)

*Primary Examiner* — Paul N Dickson
*Assistant Examiner* — Caitlin Anne Miller
(74) *Attorney, Agent, or Firm* — Jonathan A. Bay

(57) ABSTRACT

A suspension system for liftable steerable axles has at least one steering knuckle; at least one pistonless bellows air spring actuator (ie., damper air spring); and a steering axle structure that has, at each end, a kingpin housing boss, a kingpin fixed into the kingpin boss, and a pair of steering knuckles that rotate around the kingpin and are supported by the kingpin housing; wherein the steering knuckles are connected at the bottom of each other side to side by a tie rod assembly that respond to each others rotational inputs; and further having the damper air spring being connected to the steering knuckle so that, given a supplied pneumatic air force, the damper air spring stabilizes and dampens the steering road inputs when in motion.

18 Claims, 15 Drawing Sheets

(56) References Cited

U.S. PATENT DOCUMENTS

| | | | |
|---|---|---|---|
| 6,293,570 B1 * | 9/2001 | Gottschalk | B62D 7/144 |
| | | | 280/86.751 |
| 6,398,239 B1 | 6/2002 | Chalin | B62D 7/144 |
| 6,796,566 B2 * | 9/2004 | VanDenberg | B62D 61/125 |
| | | | 280/124.16 |
| 6,880,839 B2 | 4/2005 | Keeler et al. | B62D 61/12 |
| 6,957,819 B2 | 10/2005 | Chalin et al. | B60G 9/00 |
| 7,445,220 B2 * | 11/2008 | von Mayenburg | B60G 9/003 |
| | | | 280/124.113 |
| 7,510,197 B2 * | 3/2009 | Gottschalk | B60G 11/28 |
| | | | 280/86.5 |
| 7,748,724 B2 * | 7/2010 | Gottschalk | B60G 9/003 |
| | | | 280/86.5 |
| 8,403,346 B2 | 3/2013 | Chalin et al. | B60G 11/28 |
| 8,596,659 B2 | 12/2013 | Hudson | B62D 7/228 |
| 9,352,628 B2 * | 5/2016 | Barton | B62D 61/12 |
| 9,481,416 B2 * | 11/2016 | Conaway | B60G 11/28 |
| 9,664,148 B2 | 5/2017 | Foege | F02M 26/04 |
| 10,427,738 B2 | 10/2019 | Fowler et al. | B62D 6/12 |
| 10,471,988 B2 | 11/2019 | Westnedge et al. | B62D 7/228 |
| 10,543,730 B2 * | 1/2020 | Davis | B60G 17/0408 |
| 10,569,814 B2 | 2/2020 | Hulstein et al. | B62D 61/12 |
| 2004/0256820 A1 * | 12/2004 | Chalin | B60G 9/00 |
| | | | 280/86.5 |
| 2009/0206570 A1 * | 8/2009 | Strong | B62D 61/12 |
| | | | 280/86.5 |

OTHER PUBLICATIONS

Description of the "Prior Art Figures" section in U.S. Appl. No. 63/167,289, filed Mar. 29, 2021, entitled "Llift Axle Suspension Systems Using X-ROD Control Arms for Improved Lateral Stability"—Jason M. Klein et al.

* cited by examiner

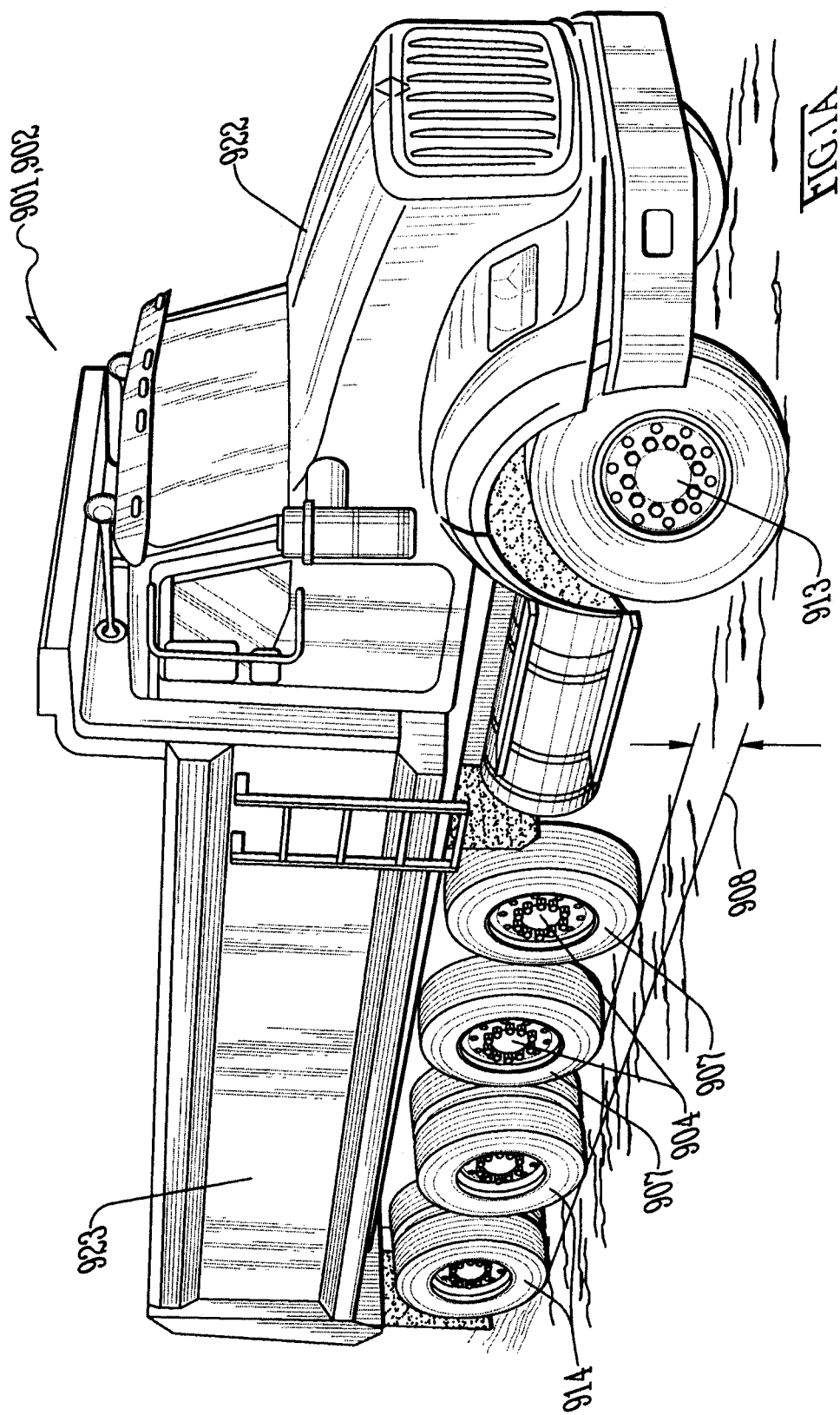

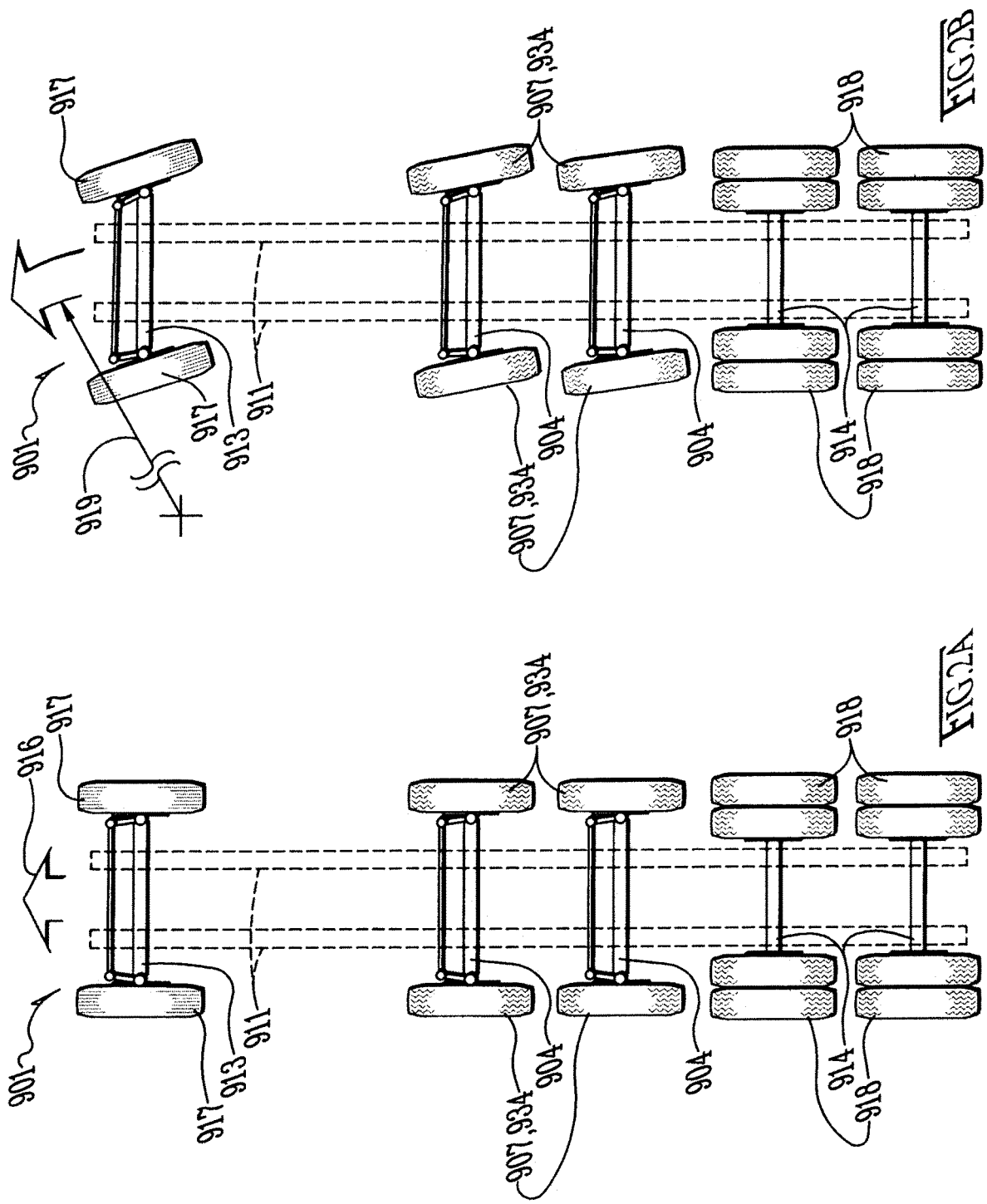

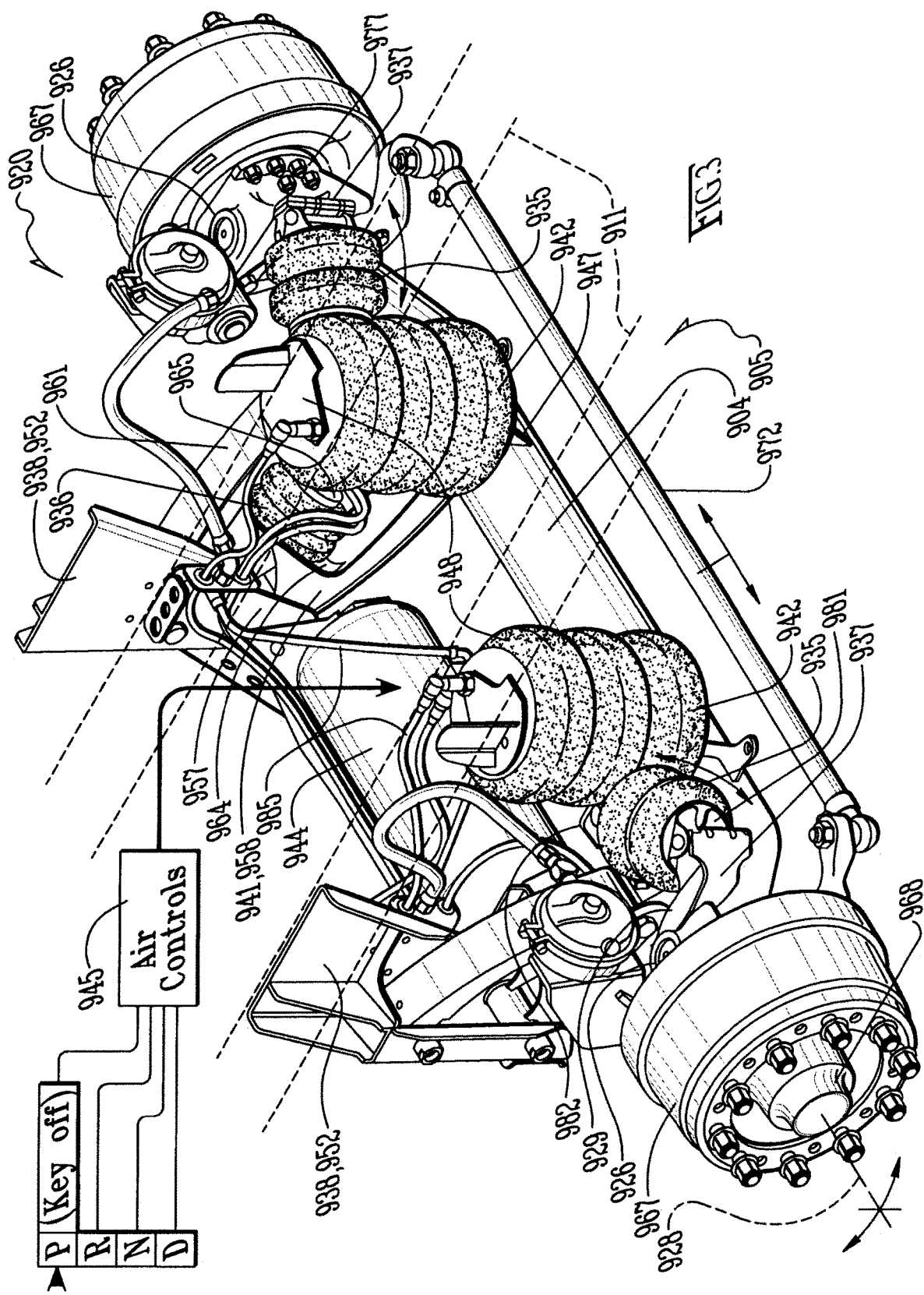

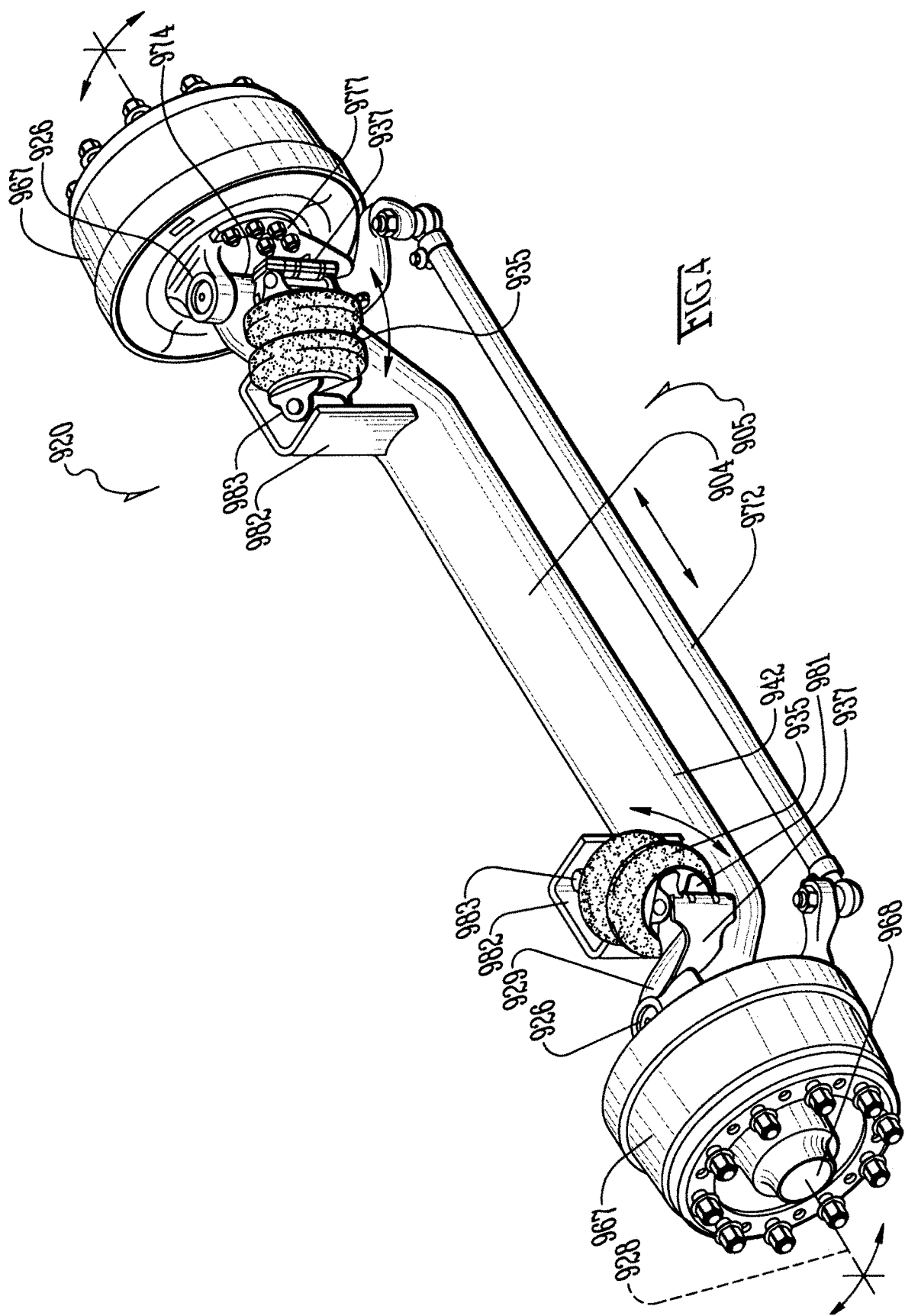

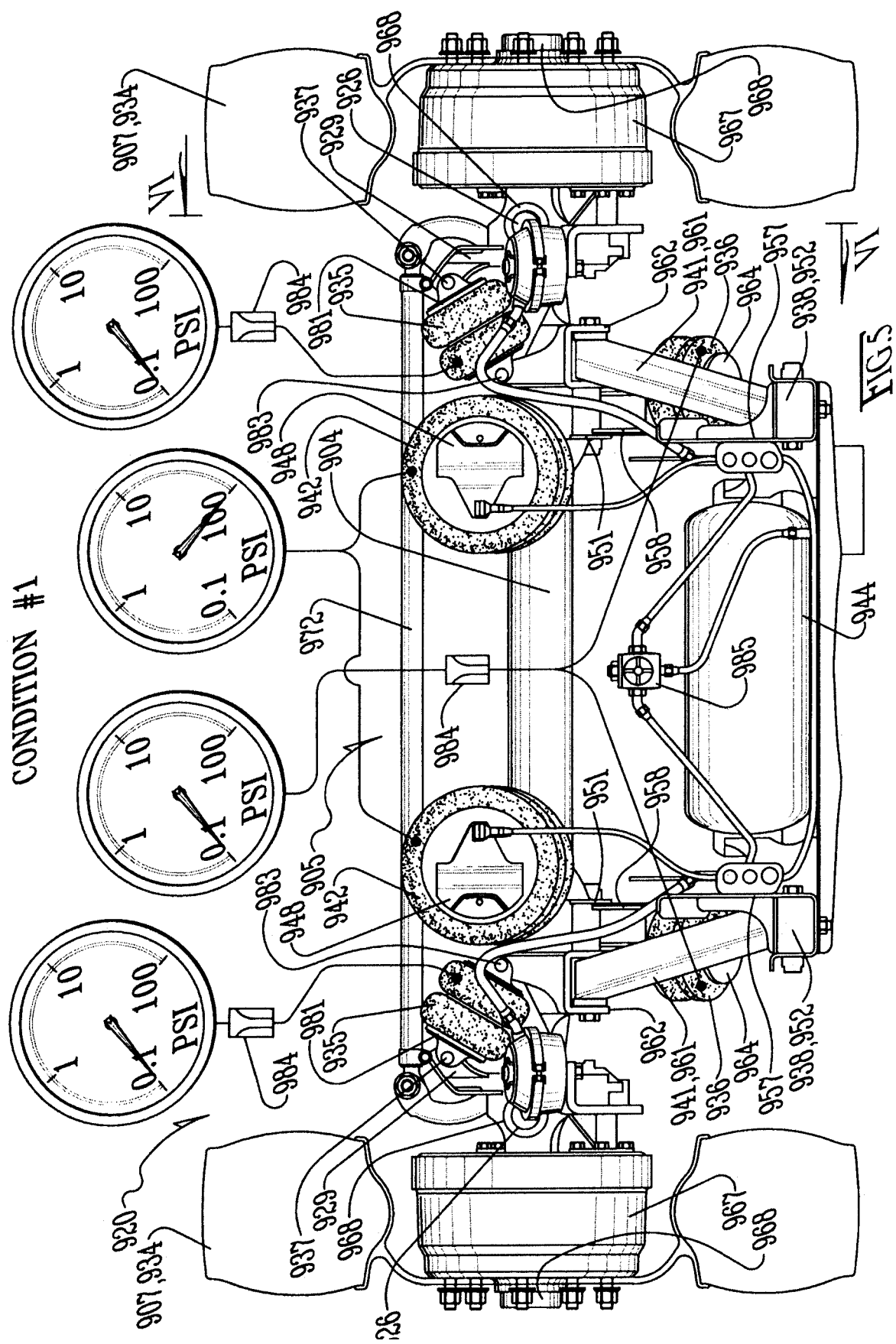

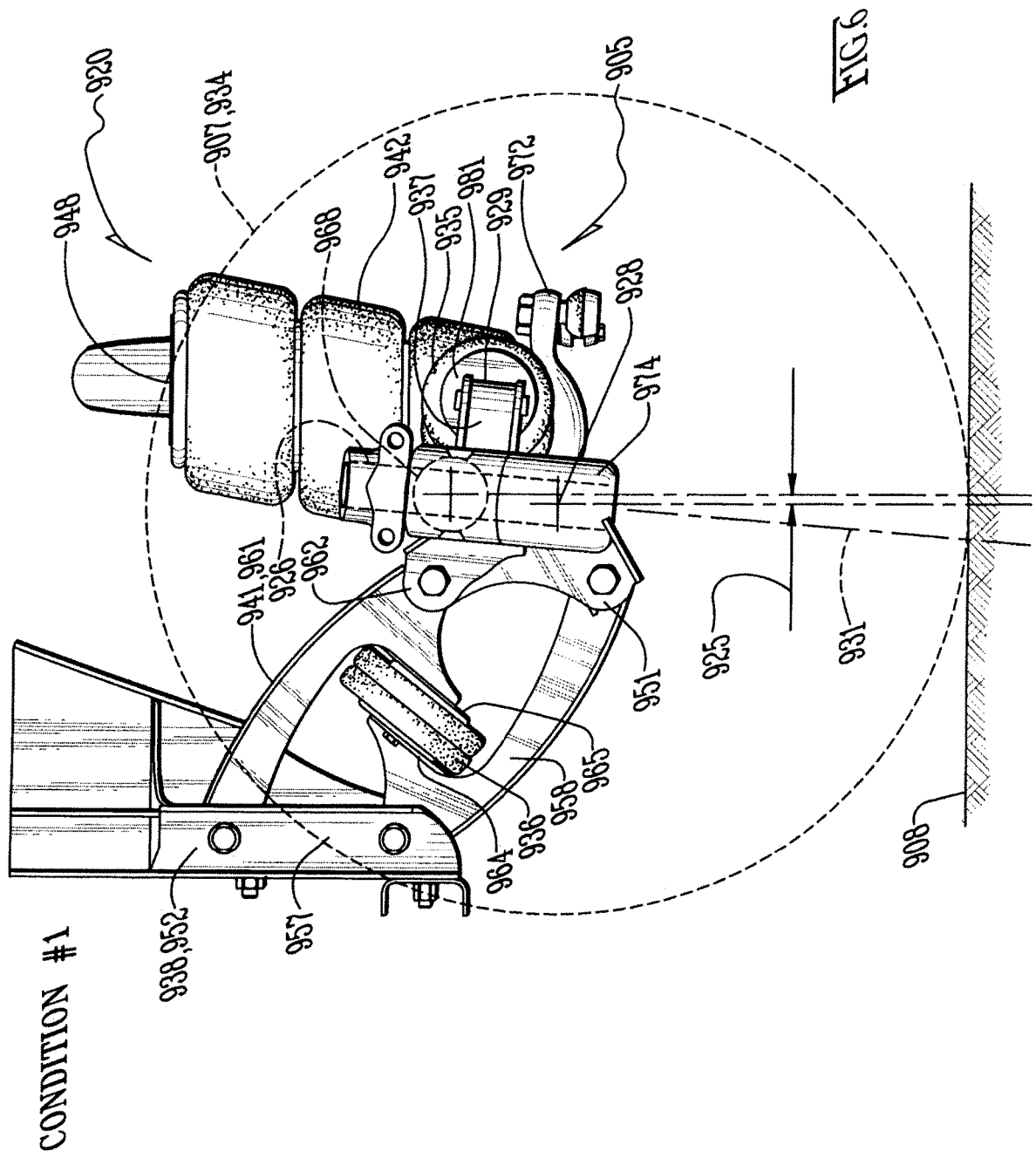

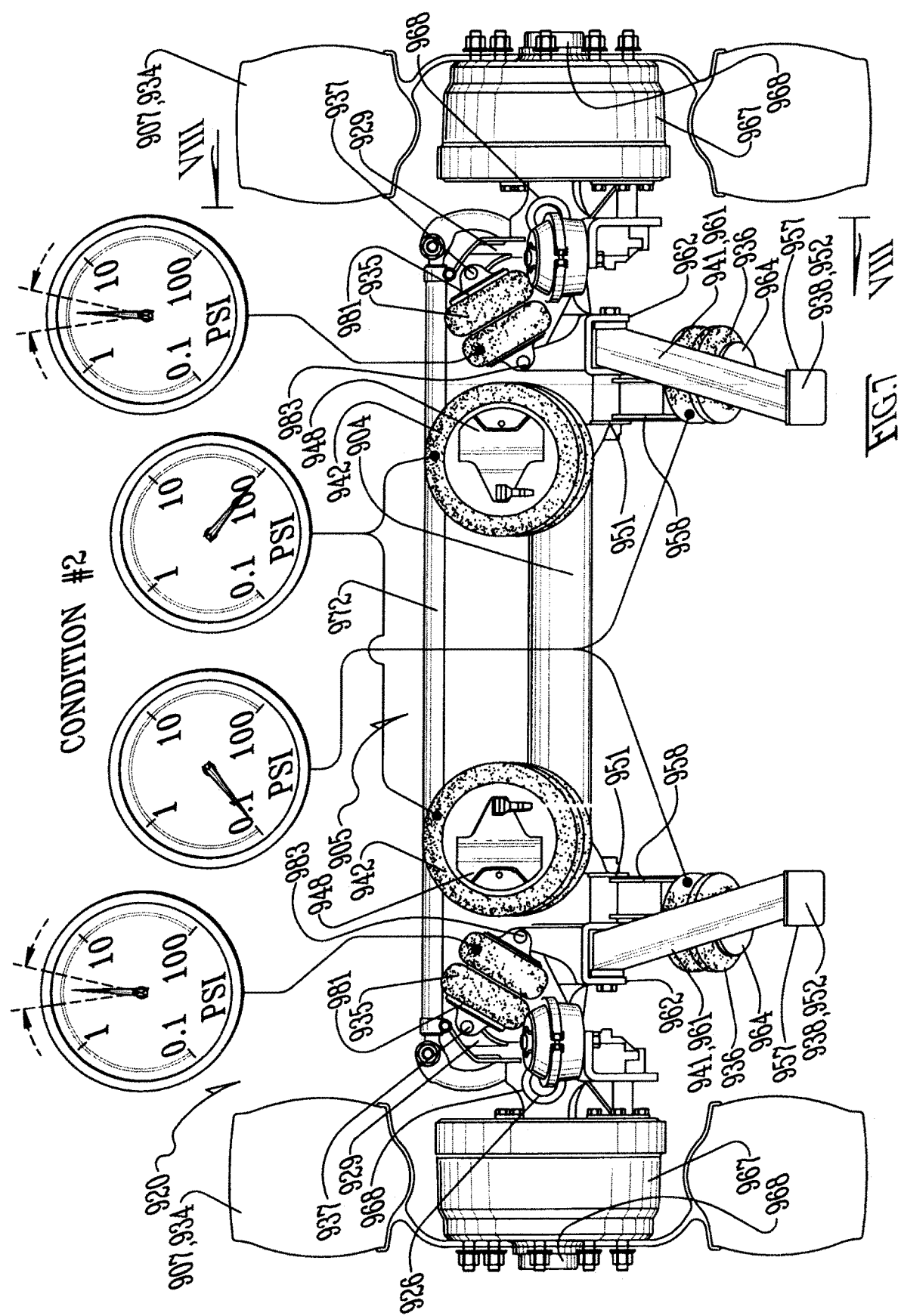

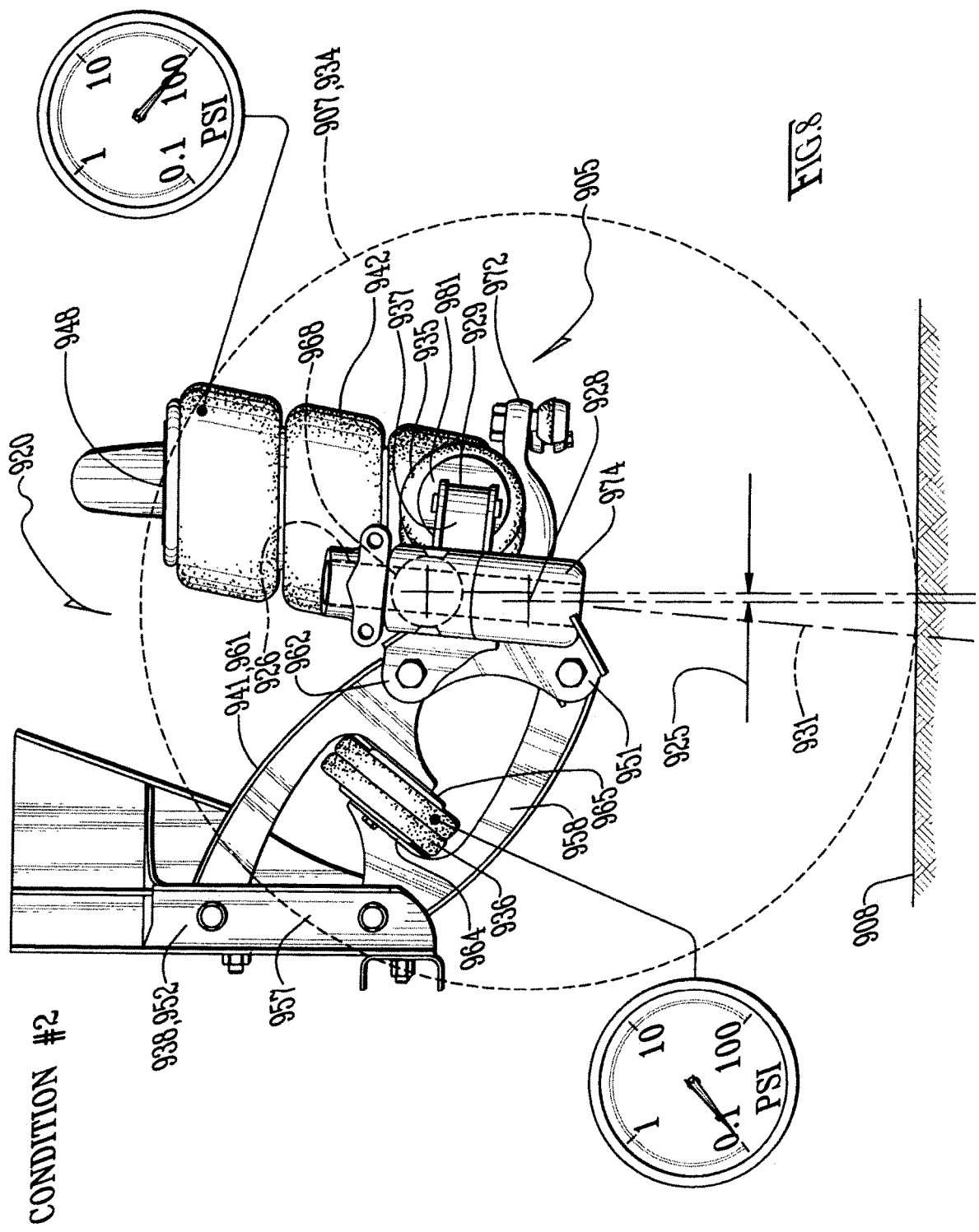

PISTONLESS PNEUMATIC DAMPENING AND STRAIGHT CENTERING FOR A STEERABLE AXLE OF A HEAVY-DUTY VEHICLE

CROSS-REFERENCE TO PROVISIONAL APPLICATION(S)

This application claims the benefit of U.S. Provisional Patent Application No. 62/984,408, filed Mar. 3, 2020. The foregoing patent disclosure(s) is(are) incorporated herein by this reference thereto.

BACKGROUND AND SUMMARY OF THE INVENTION

The invention relates to heavy duty vehicle suspensions and, more particularly, to pistonless pneumatic dampening and straight centering provisions for a steerable axle of a heavy-duty vehicle.

FIGS. 1A and 1B show a conventional heavy-duty vehicle 901 (eg., a dump truck 902) equipped with a pair of auxiliary steerable axles 904 in accordance with the invention. These axles 904 are configured as liftable steerable axles 904 in accordance with the invention, and are provided with pistonless pneumatic dampening and straight centering provisions 905 in accordance with the invention (which provisions are not in view here in FIGS. 1A-2B, but see FIGS. 3 et seq.).

In FIG. 1A, the wheels 907 of the liftable steerable axles 904 are shown locked in a lifted position (ie., lifted off and clear of the pavement 908, or tire-travel ground plane, of any composition). In FIG. 1B, the wheels 907 of the liftable steerable axles 904 are locked in a pavement-engaging position, ready for service for traveling load-bearing duty.

FIGS. 2A and 2B are schematic plan diagrams of the axle arrangement for the dump truck 902 in FIG. 1B. There is a front steering axle 913, providing the steering components for the dump truck 902 for positive steering of the vehicle 901,902. There are tandem (two) rear 'primary' axles 914, which are indeed both driven and not steerable. The primary axles 914 are fixed in a forward orientation 916 relative the longitudinal axis of the dump truck 902. And finally there are the tandem (two) auxiliary unpowered steerable axles 904 in accordance with the invention, which provide for extra load-sharing (or distribution) among the axles 914 and 904 for heavy loads. FIG. 2B shows the wheels 907, 917 and 918 respectively of the various axles 904, 913 and 914 in the respective relative positions for the wheels 907, 917 and 918 when the dump truck 902 is executing a left turn in forward gear.

The main bit of information for FIG. 2B illustrates is that, the wheels 907 of the steerable axles 904 can actually be unpowered caster wheels 907. And that's typical. They are called "steerable" axles 904 in that, the caster wheels 907 thereof, typical of caster wheels as on grocery carts or office chairs, rotate perpendicular to the turning radius 919, which for straight line motion 916, the turning radius 919 can be reckoned as infinite and perpendicular to the straight line motion 916, whereby the caster wheel 907 will then travel parallel to the direction of straight line travel 916.

Again, while called "steerable" axles 904, "steerable" does not equate with "steering."

FIG. 3 shows an auxiliary suspension package 920 in accordance with the invention, including among other components an auxiliary liftable steerable axles 904 in accordance with the invention, and as provided with pistonless pneumatic dampening and straight centering provisions 905 in accordance with the invention. FIG. 4 is comparable to FIG. 3 except showing the pistonless pneumatic dampening and straight centering steerable portions 905 of the steerable axles 904 in isolation.

Given the foregoing so far, a very brief background will make more sense now. These auxiliary axles 904 can be installed on other heavy utility vehicles 901, not just dump trucks 902, including without limitation certain types of flat bed trailers. Liftable steerable axles are seen on cement mixers too but perhaps these are distinguished from what the inventors are most familiar with because those might be a standard option offered by the manufacturer of the cement mixer, which that manufacturer installs itself.

In contrast, in the inventors experience, most of the auxiliary axles 904 seen on dump trucks 902 are typically added as an after-market accessory. Some owner operators have been known build a DIY dump truck 902 out of old semi-tractor 922. That is, these parties handy with tools and welding take old semi-tractors 920, strip off the fifth wheel and any cabin quarters (if any), add a dump box 923 and then also add one or more auxiliary axles 904. It has been reported that, the authorities in an increasing number of states are encouraging the addition and utilization of such auxiliary axles 904, for reasons ranging from reducing wear and tear on roadway pavement 908 to safer driving/cornering characteristics. Some states allow three auxiliary axles 904 in combination with the two primary axles 914. To the owner operators, reduction in tire wear is also an attractive factor.

The wheels 907 on these auxiliary axles 904 are typically mounted as caster wheels 907, very much akin to the caster wheels on office chairs or the front of grocery carts. What allows a caster wheel 907 to swivel is the characteristic which will be called here, the caster offset distance 925: namely, the small amount of offset distance 925 between (1) the vertical shaft 926 (or nearly vertical kingpin 926) and (2) the center axis 928 of the caster wheel 907. The caster wheels 907 trail, like being towed. Caster wheels 907 rotate perpendicular to a turning radius 919, which for straight line motion 916, the turning radius 919 is reckoned as infinite and perpendicular to the straight line travel 916, whereby caster wheels 907 then travel parallel to the direction of straight line travel 916.

With grocery carts or office chairs, it is readily permissible to push the cart or chair in one given direction of travel, and then reverse the direction to go the opposite way because those caster wheels 907 will rotate 180° about their vertical shafts 926 and again take the trailing position.

But unlike grocery carts or office chairs, the caster wheels 907 of steerable auxiliary axles 904 for heavy duty-duty vehicles 901 cannot rotate in 360°. Thus, there is a problem, and one to be solved to allow the vehicle 901 to be backed-up in reverse gear.

Again, the caster wheels 907 of a steerable axles 904 cannot swivel themselves 180° when the vehicle 901 is backing up in reverse. They can't get close. This is due to many factors, one being that the kingpins 926 are not vertical but oriented on a 'caster' angle that is at 5° to the forward position (see any of FIG. 6, 8, 10 or 12).

Note that, a wheel (eg., 917) can be mounted on a 'caster' angle but without the "caster" offset distance 925, it is not a "caster" wheel.

'Caster' angle aside, there are other factors limiting caster wheel 907 swiveling on steerable axles 904 on a heavy-duty vehicle 901. One factor includes that the steering knuckle will have limited angular articulation about the kingpin axis 931, another that the tires 934 will bump against some portion of vehicle frame 911, and so on.

So various accommodations have been made in the past.

An expensive solution is a power system that positively steers the caster wheels 907 in counter-part complimentary reverse angles for reverse gear travel. But again this is an expensive system.

Alternatively, the auxiliary steerable axles 904 can be lifted up when the vehicle 901 is backing-up in reverse gear, but this removes the load share off the auxiliary steerable axles 904 and then 'dumps' or re-distributes that load share onto the other vehicle axles 914 and 913, which could cause damage or make things unstable. When a significant load share on the other axles 914 and 913 is suddenly dumped on them, the camber angle of those axles 914 and 913 will change, generally to the negative (ie., they are going to do the splits). Those axles 914 and 913 could suffer damage to their components, including somewhat sensitive steering components of the front axle 913.

Still another accommodation is to lock the swivel capability of the caster wheels 907 when the vehicle 901 is backing-up in reverse gear. The swivel capability of the caster wheels 907 can be "locked" with a physical pin lock, or, with a locking force applied to the tie rod.

It is an object of the invention to "lock by force," or limit, the swivel capability of the caster wheels 907 when the vehicle 901 is backing-up in reverse gear.

It is another object of the invention to not only limit or lock the swivel capability of the caster wheels 907 but also force the steerable axles 904 to a centered position so that the wheels 907 are aligned with the vehicle frame 911 when the vehicle 901 is backing-up in reverse gear. This limits tire scuffing.

To return to matters regarding (forward) travel 916 in forward gear, it is still a further object of the invention to provide damping to caster wheel 907 flutter. That is, one unwanted characteristic of caster wheels 907 (even traveling in forward straight line motion 916, and easily recognized in every day experience with grocery carts) is that caster wheels 907 have a tendency to "flutter." So accordingly, it is a further object of the invention to provide flutter dampening.

These and other objects and aspects of invention seek to simplify the steerable dampening and centering system 905 of a liftable and steerable suspension system. One way to do this is to reduce the number of components to perform the same function. It is an aspect of the invention to use a pistonless air spring 935, or more particularly for example and without limitation, a bellows air spring 935, such that one component fulfills the roles of three components nowadays. That is, one such air spring 935 takes the place of a hydraulic shock absorber, a coil spring, and a brake chamber centering device. This bellows air spring 935 can have a low pressure air pressurization level applied to it to offer steerable dampening, and then, a higher pressure air pressurization level applied to it when either (1) the vehicle 901 is being backed-up in reverse gear or also (2) when the axle 904 is lifted. The higher pressure air pressurization level forces the steerable axle 904 such that the steerable wheels 907 are forced to be straight and centered. This higher pressure air pressurization level can be the same air pressurization level that is given to the lift air springs 936, thereby also simplifying the system. The bellows air spring 935 can be connected directly to the steering knuckle 929 upper steering link 937.

In summary, it is an object of the invention to provide pistonless pneumatic dampening and straight centering provisions 905 for a steerable axle 904 of a heavy-duty vehicle 901.

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings, FIG. 1A is a perspective view of a conventional heavy-duty vehicle (a dump truck) equipped with a pair of auxiliary axles in accordance with the invention comprising liftable steerable axles in accordance with the invention, provided with pistonless pneumatic dampening and straight centering provisions in accordance with the invention (not in view, but see FIGS. 3 et seq.), wherein the wheels of the liftable steerable axles are shown locked in a lifted position (as in, lifted off and clear of the pavement, or tire-travel ground plane);

FIG. 2A is a top plan schematic plan diagram of the axle arrangement for the dump truck in FIG. 1B;

FIG. 2B is a top plan schematic diagram comparable to FIG. 2A except showing the dump truck executing a left turn in forward gear, and, thereby providing the first occasion here to illustrate that the wheels of liftable steerable axles can be, and are typically, unpowered caster wheels;

FIG. 3 is an enlarged-scale perspective view of an auxiliary suspension package in accordance with the invention, including among other components an auxiliary liftable steerable axle in accordance with the invention, which is provided with pistonless pneumatic dampening and straight centering provisions in accordance with the invention, wherein only a spare portion of the vehicle (eg., sub-frame) is shown in hidden lines, all other portions being broken away;

FIG. 4 is a perspective view comparable to FIG. 3 except showing the axle and its pistonless pneumatic dampening and straight centering steerable provisions in isolation;

FIG. 5 is a top plan view of FIG. 3, spun 120° counter-clockwise, representing a Condition No. 1 with regard to the pneumatic system, wherein everything is depressurized;

FIG. 6 is a side elevational view of taken in the direction of arrows VI-VI in FIG. 5;

FIG. 7 is a top plan view comparable to FIG. 5, representing a Condition No. 2 with regard to the pneumatic system, and schematically enhanced by depiction of imaginary dials of pressure gauges, wherein Condition No. 2 represents for example the lift wheels engaging the pavement and serving load-bearing duty during travel of the vehicle in forward gear (not reverse), whereby the left and right dampening air springs are shown pressurized to about 5 psi (some low pressure input) but fluttering by small oscillations just above and below the 5 psi benchmark, and also showing that the lift air springs are depressurized;

FIG. 8 is a side elevational view of taken in the direction of arrows VIII-VIII in FIG. 7, and comparable to the side elevational view of FIG. 6, still representing Condition No. 2 with regard to the pneumatic system, wherein the load air springs are shown pressurized to 100 psi (some high pressure input) in contrast to the lift air springs, which remain depressurized;

DETAILED DESCRIPTION OF THE PREFERRED EMBODIMENTS

Figure 1B:
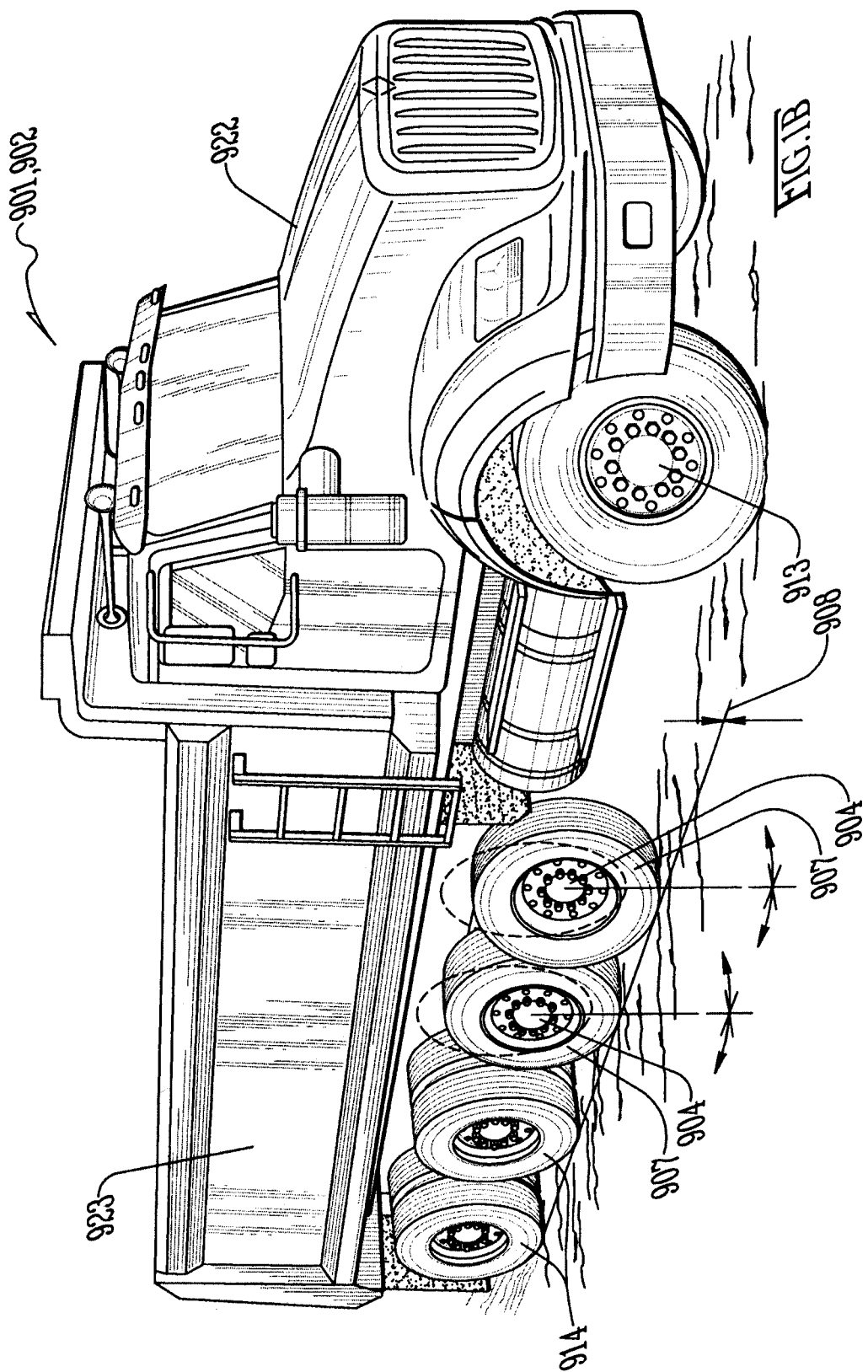
FIG. 1B is a perspective view comparable to FIG. 1A except showing the wheels of the liftable steerable axles locked in a ground-engaging position, ready for service for traveling load-bearing duty.

FIGS. 3, 5 and 6 show an auxiliary suspension package 920 in accordance with the invention, including among other components an auxiliary liftable steerable axles 904 in accordance with the invention, which is provided with pistonless pneumatic dampening and straight centering provisions 905 in accordance with the invention.

FIG. 4 is comparable to FIG. 3 except showing the steerable axles 904 and its pistonless pneumatic dampening and straight centering steerable provisions 905 of the axles 904 in isolation. FIG. 5 is a top plan view of FIG. 3, spun 120° counterclockwise. FIG. 6 is a side elevational view of taken in the direction of the arrows VI-VI in FIG. 5.

Again, this auxiliary suspension package 920 is preferably available as an after-market installation project for upgrading a heavy vehicle 901 with additional auxiliary axles 904.

The auxiliary suspension package 920 comprises a left and right laterally spaced hanger bracket 938 for mounting under the frame or frame members 911 of a heavy vehicle 901, a laterally elongated axle 904, left and right laterally spaced trailing arms 941 extending between the hanger brackets 938 and axle 904, and laterally spaced left and right load air springs 942 situated between the axle 904 and the frame or frame members 911 of a heavy vehicle 901.

Disposed between the hanger brackets 938 is an air tank 944, serving as a local reservoir of pressurized air. A control package 945 is also mounted to one or the other of the hanger brackets 938. The control package 945 comprises electric componentry including without limitation an electronic control unit, control input and output signal lines including signal lines to the motor vehicle 901's cab for operator controls, lines connected to the motor vehicle 901's CAN bus or other vehicle multiplex to read at least Park, Reverse, Neutral, Drive and the like. The control package 945 further comprises pneumatic componentry 984 and/or 985 including without limitation pneumatic lines, fittings, valves 985, specifically-sized and placed orifices 984, and so on.

The axle 904 is fitted with laterally spaced left and right seats 947 for seating the left and right load air springs 942. These load air spring seats 947 are typically welded on, but can be fastened in the alternative. The frame or fame members 911 of the vehicle 901 are correspondingly fitted with laterally spaced left and right top-end seats 948 connecting the top-ends of the left and right load air springs 942. These top-end seats 948 are typically bolted on.

Each trailing arm 941 has an end or margin 951 engaged in a load bearing connection 952 to the axle 904 at a position laterally spaced from the load bearing connection 952 of the other end of the trailing arm 941. Each trailing arm 941 further has an opposite end or margin 952 engaged in another load-bearing connection to the respective hanger bracket 938. The auxiliary suspension package 920 further comprises laterally spaced left and right lift air springs 936 which when pressurized hold the axle 904 in a lifted position (ie., lifted off and clear of the pavement 908, or tire-travel ground plane, of any composition), and when depressurized, the lift air springs 936 drop (lower) the axle 904 until the tires 934 of the steerable axle 904 are locked are in a pavement 908 (or tire-travel ground plane) engaging position, ready for service for traveling load-bearing duty.

Note that the load air springs 942 and lift air springs 936 operate in sort of a see-saw fashion. When the load air springs 942 are pressurized, the lift air springs 936 are depressurized (see FIG. 12). And then when the lift air springs 936 are to be pressurized, the load air springs 942 are depressurized (see FIG. 14). Both pairs of air springs 936 and 942 are pressurized to about the same nominal working pressure, for example and without limitation 100 psi. This working pressure will be referred to as the high pressure value, in view of a low pressure value to be described below but is still a level of pressurization distinctively above ambient (atmospheric) pressure.

So again, when the lift air springs 936 are pressurized, the lift air springs 936 inflate from a deflated collapsed state, to an expanded inflated state. The lineal stroke distance between the collapsed state and the expanded state provides the mechanical stroke distance to drive the axle 904 from the ground-state to the lifted state. But in order to allow that to happen, the load air springs 942 have to be depressurized whereby the load air springs 942 undergo lineal stroke from an expanded inflated state to a deflated collapsed state. Once again, the load air springs 942 and lift air springs 936 alternate between one pair being pressurized as the other pair is depressurized, and, the one pair later alternatively being depressurized as the other pair is correspondingly later alternatively pressurized.

At some original time, in the factory or sometime, the auxiliary suspension package 920 is depressurized. Then when the auxiliary suspension package 920 is installed on a vehicle 901, or perhaps before then, there is an initial pressurization event. Generally, from that time forward, there will be a continual see-saw between which of the load air springs 942 and lift air springs 936 are pressurized in contrast to the others being depressurized.

FIG. 6 shows one manner of harnessing the extension stroke of the lift air springs 936 to lift the axle 904. Each trailing arm 941 comprises a four-bar mechanism 957, 958, 961, 962 with one lift air spring 936 disposed between spaced links 958 and 961. That is, four bar mechanism 957, 958, 961, 962 comprises four links 957, 958, 961, 962 connected in a loop which here, in FIG. 6, are all pivotally connected, at the four corners of the four bar mechanism 957, 958, 961, 962 needless to say. There is a ground link 957 (not earth ground, but 'ground' relative to the four bar system 957, 958, 961, 962), which here the ground link 957 a vertical span of the hanger bracket 938. There are a (vertically) spaced pair of crank links 958 and 961 each pivoted at a relative base end to the ground link 957 (the hanger bracket 938) and a driven link 962 pivotally connected between the distal ends of the upper and lower crank links 961 and 958.

The reference to the fourth link 962 as the 'driven' link 962 is for convenience in this description, and in other fields of industry may take on names like coupler, connecting rod, floating link and so on.

The lift air spring 936 is disposed between air spring seats 964 and 965 forming lever arms projected inwardly from each crank link 958 and 961. Hence the lower crank link 958 has a rear facing, upwardly extending air seat 964 and the upper crank 965 has a forward facing, downwardly extending air seat 965 which, in FIG. 6, the two air seats 964 and 965 are spaced by a narrow gap, which is filled by the depressurized collapsed lift air spring 936. Note that the load air spring 942 is in an extended state.

Figure 14:
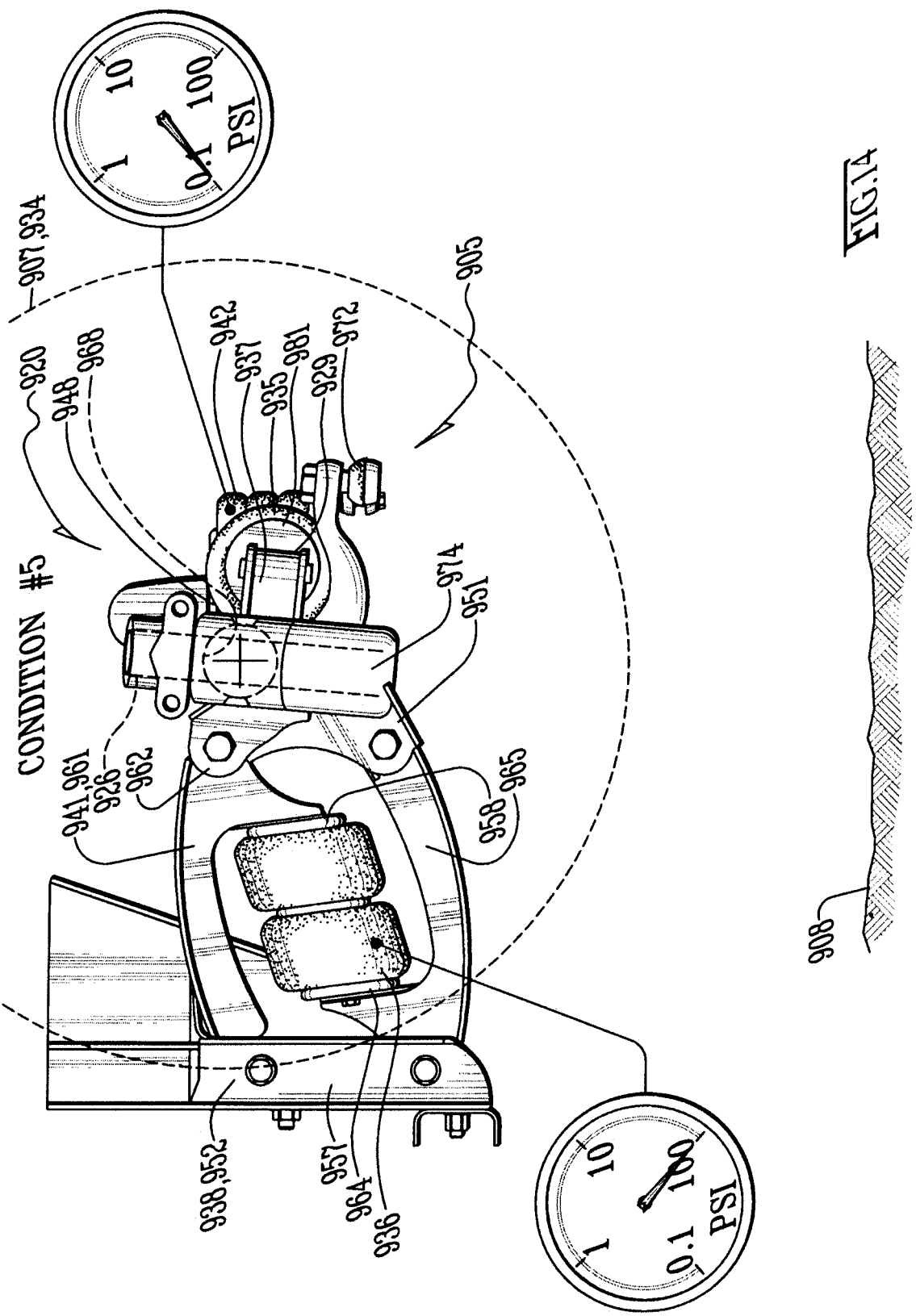
FIG. 14 is a side elevational view of taken in the direction of arrows XIV-XIV in FIG. 12, and comparable to the side elevational views of FIGS. 6, 8, 10 and 12, still representing Condition No. 5 with regard to the pneumatic system, wherein the load air springs have been depressurized flat whereas the lift air springs, as mentioned in connection with FIG. 13, have been pressurized to 100 psi (ie., some high pressure input).

To look ahead to FIG. 14, the situation is see-sawed to where the lift air spring 936 is pressurized into a pressurized extended state, and the load air spring 942 is in a depressurized collapsed state. The closely spaced air seats 964 and 965 of the trailing arm 941 four bar mechanism 957, 958, 961, 962 (closely spaced as shown in FIG. 6) are driven apart as shown in FIG. 14. The axle 904 has hence been lifted. As an aside, when the motor vehicle 901 is shut OFF and parked for the night or weekend, the lift air springs 936 can hold that pressurization (perhaps with some assist from the local air tank 944 or other systems). But effectively, the axles 904 is lifted and locked there.

To return to FIGS. 3-6 and particularly to FIG. 4, the auxiliary suspension package 920 moreover comprises left and right laterally spaced steerable wheels 907 (hubs 967 thereof are shown in FIG. 4) rotatably connected at the left and right ends 968 of the axle 904 (the "steerable" axle 904), as well as, the pistonless pneumatic dampening and straight centering provisions 905 for the steerable wheels 907 (hubs 967).

These pistonless pneumatic dampening and straight centering provisions 905 comprise left and right laterally-spaced "dampening and straight centering" air springs 935, and then also, another four bar system 904, 937, 937, 972. For convenience in this description, "dampening and straight centering" air springs 935 will be referred to as damper air springs 935.

In this four bar system 904, 937, 937, 972, the axle 904 is the relative ground link (not earth ground, but 'ground' relative to the four bar system 904, 937, 937, 972), the links 937 of the left and right laterally spaced steering knuckles 929 served as the cranks which are pivotally connected at their base ends to left and right laterally spaced kingpins 926 having stationary axes 931 relative to the axle 904. Here, a tie bar 972 serves the function as the floating link, and is pivotally connected between the distal ends of the links 937 of the left and right steering knuckles 929.

The axle 904 has left and right laterally spaced kingpin housing bosses 974, and the laterally left and right steering knuckles 929 are pivotally pinned with respect to the kingpin housing bosses 974 of the kingpins 926. Each steering knuckle 929 has outboard faces 977 coupled to wheel hubs 967. Each steering knuckle 929 further has a steering link 937 (sometimes referred to as an 'upper' steering link 937). Each steering link 937 serves as a lever arm, pivotal about the kingpin axis 931, in a plane perpendicular to the kingpin axis 931 (eg., in a plane titled about 5° down from horizontal in the rear direction).

Each steering link 937 is fitted with an inboard and forward facing air spring seat 981. Correspondingly, the axle 904 is provided with left and right laterally spaced bracket structures 982, each of which bracket structure 982 is fitted with a generally outboard and rearward facing air spring seat 983. The respective left set of inboard-forward and outboard-rearward facing air spring seats 981 and 983 are spaced from each other as shown in FIG. 7 when the wheels 907 are straight forward. It is between these left and right spaced set of air spring seats 981 and 983 that the left and right damper air springs 935 are seated.

In FIG. 7, the damper air springs 935 are pressurized to the lower working pressure pressurization level, which typically will be an equalization pressure of about 5 to 8 psi. FIG. 7 shows the lower working pressure pressurization level to be 5 psi. FIG. 7 is also representative of the utility vehicle 901 traveling forward over the pavement 908 in a straight line path. The steerable wheels 907 are straight, but the imaginary pressure gauges are showing the respective needles oscillating due to the dampening effect the damper air springs 935 provide again to dampen caster wheel 907 flutter.

Given the foregoing, what follows next is a description of control topics including inputs, responses and even lists of concurrent states which will look like truth tables.

Preliminarily, the following are preferred general rules of the road.

Either a first state is true or a second state is true, but no others: first state=load air springs 942 pressurized, lift air springs 936 depressurized; second state=load air springs 942 depressurized, lift air springs 936 pressurized.

Lift air springs 936 can only be switched from the depressurized state to the pressurized state when the vehicle 901 is in PARK. The damper air springs 935 will simultaneously go to a fully pressurized state at the high working pressure pressurized state (100 psi). This will drive the steerable wheels 907 straight centered alongside the vehicle 901. So while the vehicle 901 can be driven around with the auxiliary wheels 907 lifted, the tires 934 won't be sticking out and side-swiping things. This is more a matter of getting your oars back into the boat before motoring away.

Similarly, lift air springs 936 can only be switched from the pressurized state to the depressurized state when the vehicle 901 is in PARK. The load air springs 942 will simultaneously go to a fully pressurized state at the high working pressure pressurized state (100 psi). And preferably still, the damper air springs 935 will remain at the fully pressurized state at the high working pressure pressurized state (100 psi), holding the auxiliary wheels 907 in the straight centered disposition. +

If immediately thereafter, the vehicle 901 in shifted into REVERSE, the damper air springs 935 will continue to remain at the fully pressurized state at the high working pressure pressurized state (100 psi), holding the auxiliary wheels 907 in the straight centered disposition.

When the lift air springs 936 are in the depressurized state, and then when the vehicle 901 is shifted into FORWARD, the damper air springs 935 will simultaneously go to the lower working pressure pressurized state (5 psi).

When sometime thereafter, the vehicle 901 in shifted into REVERSE, operation of the vehicle 901 might be suspended to the operator until the damper air springs 935 have had time to pressurize a fully pressurized state at the high working pressure pressurized state (100 psi).

Now to go back to FIGS. 5 and 6, no comment was made about this before but each of FIGS. 5 and 6 is labeled as "Condition No. 1." That signifies that FIGS. 5 and 6 show a condition in the pneumatic system which represents the states of things in connection with "Condition No. 1." It doesn't really matter what state of things are in connection with this "Condition No. 1." FIGS. 5 and 6 serve two other purposes here. The first purpose above was to provide illustrations for the description of the components of the invention. The second purpose which follows is to allow comparison with FIGS. 7-8 (Condition No. 2), FIGS. 9-10 (Condition No. 3), FIGS. 11-12 (Condition No. 4), and FIGS. 13-14 (Condition No. 5).

Condition Tables

CONDITION No. 1. this is just a reference condition, eg., all can be depressurized.
CONDITION No. 2.—Direction of travel=straight forward.
(This could be the same for some time into a steady curve).

| Which air springs | Pressurization level. |
|---|---|
| LOAD | ±100 |
| LIFT | 0 |
| DAMPER 1 | ±5 |
| DAMPER 2 | ±5 |

CONDITION No. 3.—Direction of travel=forward travel, but also initiating a turn.
(Note: coming out of the turn is the reverse).

| Which air springs | Pressurization level. |
|---|---|
| LOAD | ±100 |
| LIFT | 0 |
| DAMPER 1 | ±3 . . . wherein damper 1 is on the outside of the turn |
| DAMPER 2 | ±7 . . . and damper 2 is on the inside of the turn |

CONDITION No. 4.—Direction of travel=Reverse and loaded.

| Which air springs | Pressurization level. |
|---|---|
| LOAD | ±100 |
| LIFT | 0 |
| DAMPER 1 | ±100 |
| DAMPER 2 | ±100 |

CONDITION No. 5.—Direction of travel=generally park.
(But forward travel in this condition is also typical).

| Which air springs | Pressurization level. |
|---|---|
| LOAD | 0 |
| LIFT | 100 |
| DAMPER 1 | 100 |
| DAMPER 2 | 100 |

FIG. 7 is a top plan view comparable to FIG. 5, representing Condition No. 2 with regard to the pneumatic system, and schematically enhanced by depiction of imaginary dials of pressure gauges, wherein Condition No. 2 represents for example the lift wheels 907 engaging the pavement 908 and serving load-bearing duty during travel of the vehicle 901 in forward gear (not reverse), whereby the left and right dampening air springs 935 are shown pressurized to about 5 psi but fluttering by small oscillations just above and below the 5 psi benchmark, and also showing that the lift air springs 936 are depressurized.

FIG. 8 is a side elevational view of taken in the direction of arrows VIII-VIII in FIG. 7, and comparable to the side elevational view of FIG. 6, still representing Condition No. 2 with regard to the pneumatic system, wherein the load air springs 942 are shown pressurized to 100 psi in contrast to the lift air springs 936, which remain depressurized.

Figure 9:
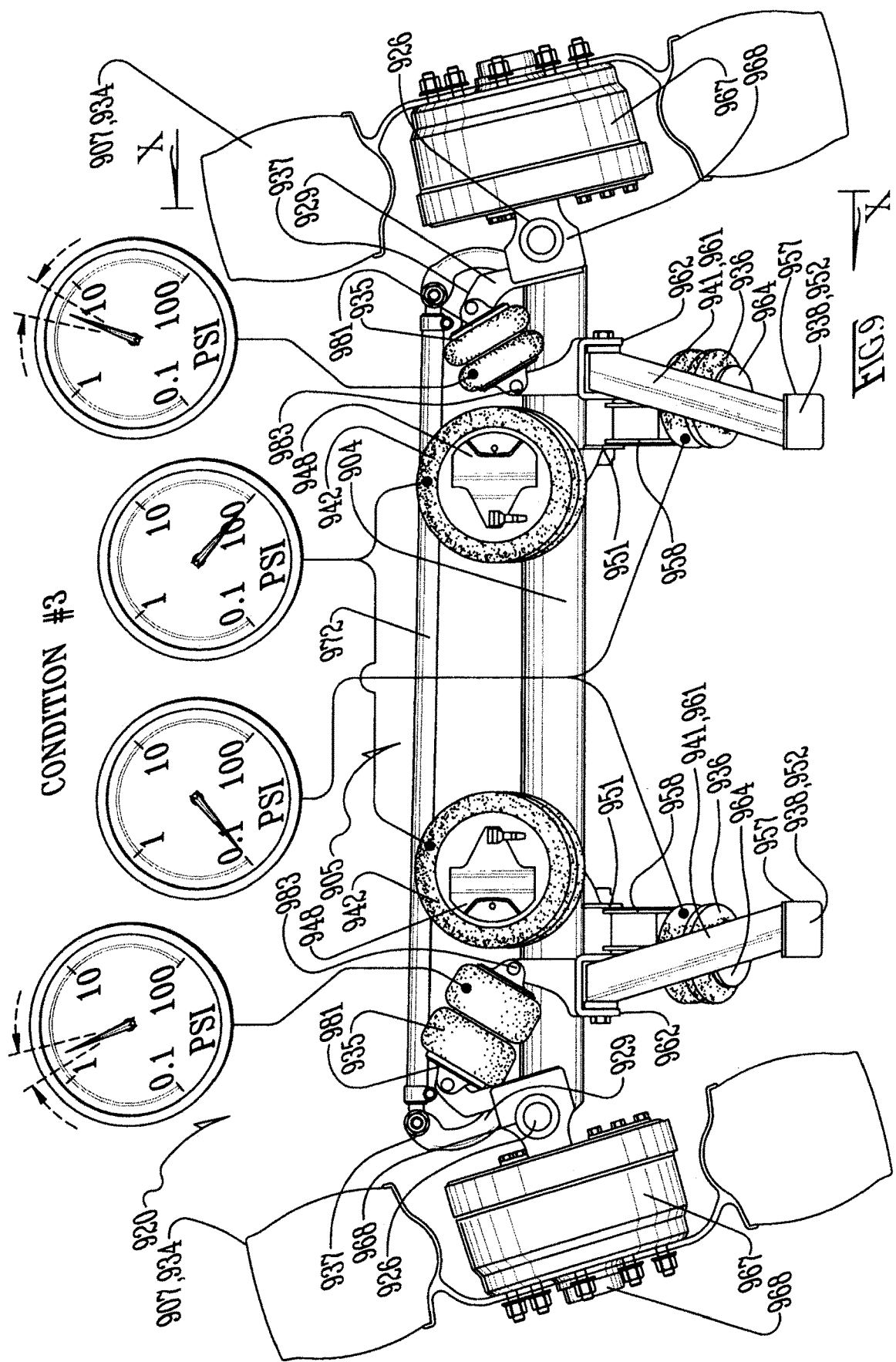
FIG. 9 is a top plan view comparable to FIGS. 5 and 7, representing a Condition No. 3 with regard to the pneumatic system, for example the vehicle initiating a left turn, wherein the left dampening air spring (the inside turn dampening air spring) flutters about some pressure nominally above 5 psi while the right dampening air spring (corresponding, the outside turn dampening air spring) flutters about some pressure nominally below 5 psi, all the while the lift air springs remain depressurized.

FIG. 9 is a top plan view comparable to FIGS. 5 and 7, representing Condition No. 3 with regard to the pneumatic system, for example the vehicle 901 initiating a left turn, wherein the left dampening air spring 935 flutters about some pressure nominally above 5 psi while the right dampening air spring 935 flutters about some pressure nominally below 5 psi, all the while the lift air springs 936 remain depressurized.

Figure 10:
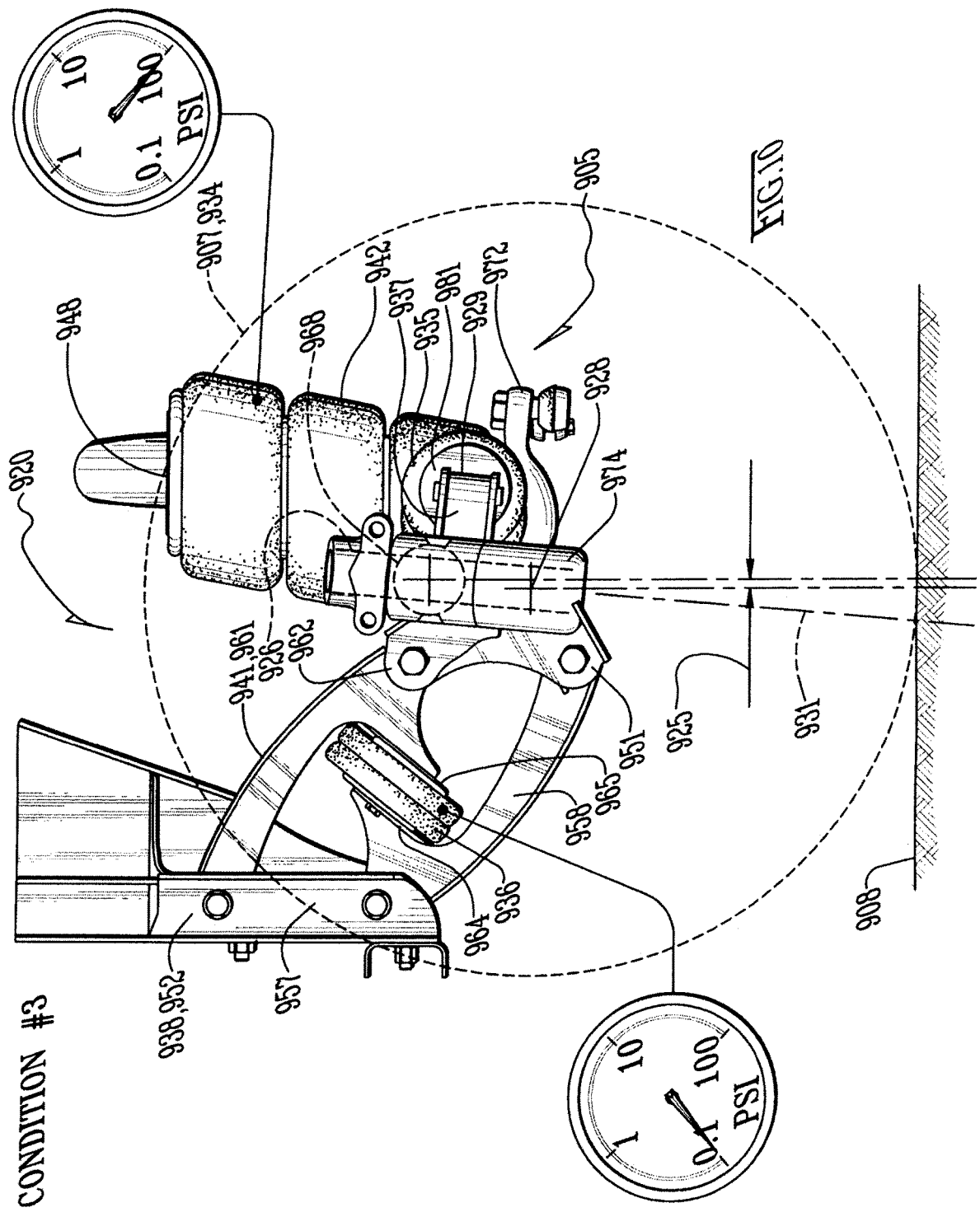
FIG. 10 is a side elevational view of taken in the direction of arrows X-X in FIG. 9, and comparable to the side elevational views of FIGS. 6 and 8, still representing Condition No. 3 with regard to the pneumatic system, wherein the load air springs remain pressurized to 100 psi (or some high pressure input) while the lift air springs remain depressurized.

FIG. 10 is a side elevational view of taken in the direction of arrows X-X in FIG. 9, and comparable to the side elevational views of FIGS. 6 and 8, still representing Condition No. 3 with regard to the pneumatic system, wherein the load air springs 942 remain pressurized to 100 psi while the lift air springs 936 remain depressurized.

Figure 11:
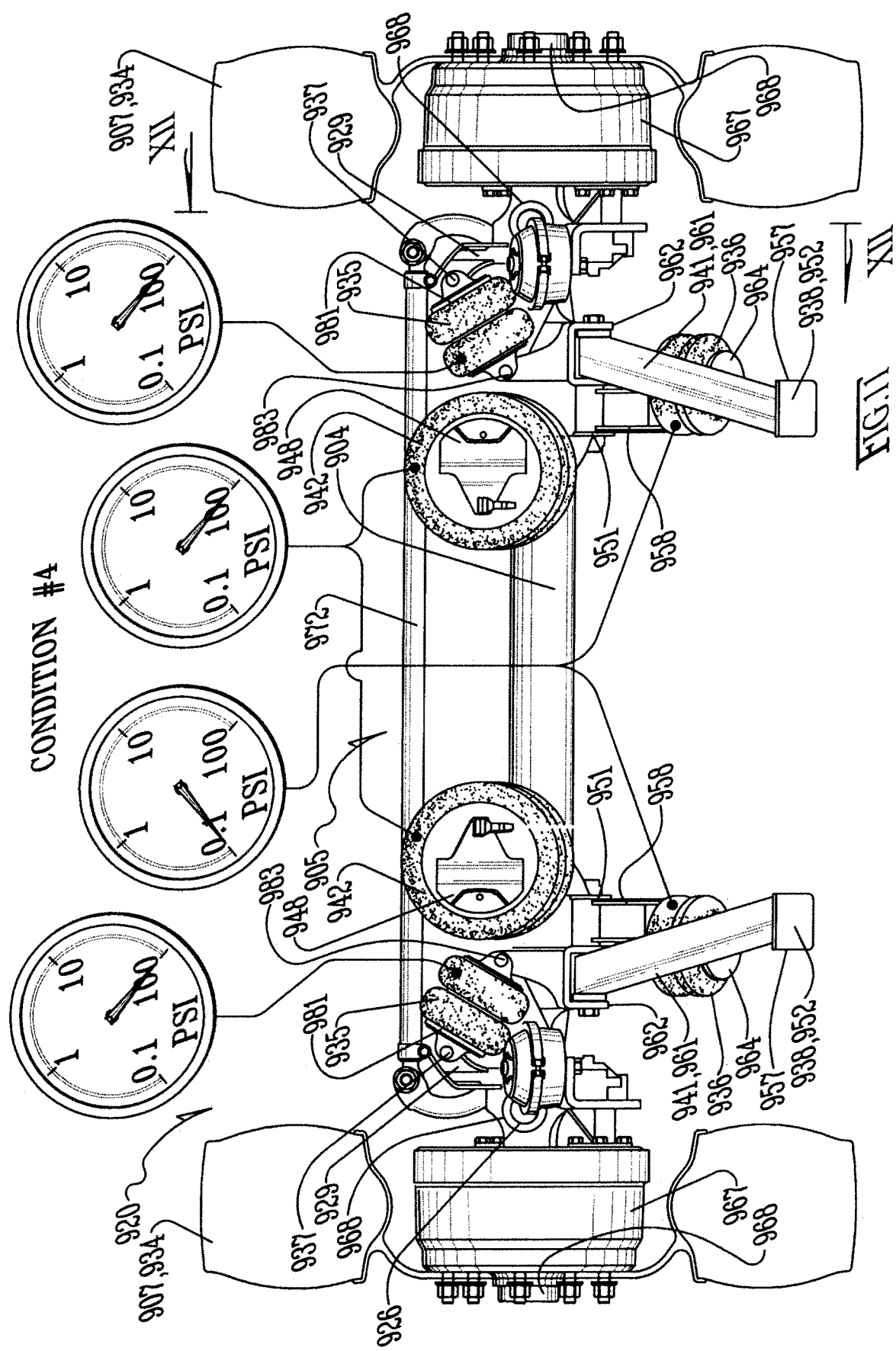
FIG. 11 is a top plan view comparable to FIGS. 5, 7 and 9, representing a Condition No. 4 with regard to the pneumatic system, for example backing up the vehicle in reverse gear, wherein the left and right dampening air spring have been boosted in pressure to 100 psi (or a high pressure input), still all the while the lift air springs remain depressurized.

FIG. 11 is a top plan view comparable to FIGS. 5, 7 and 9, representing Condition No. 4 with regard to the pneumatic system, for example backing up the vehicle 901 in reverse gear, wherein the left and right dampening air spring 935 have been boosted in pressure to 100 psi, still all the while the lift air springs 936 remain depressurized.

Figure 12:
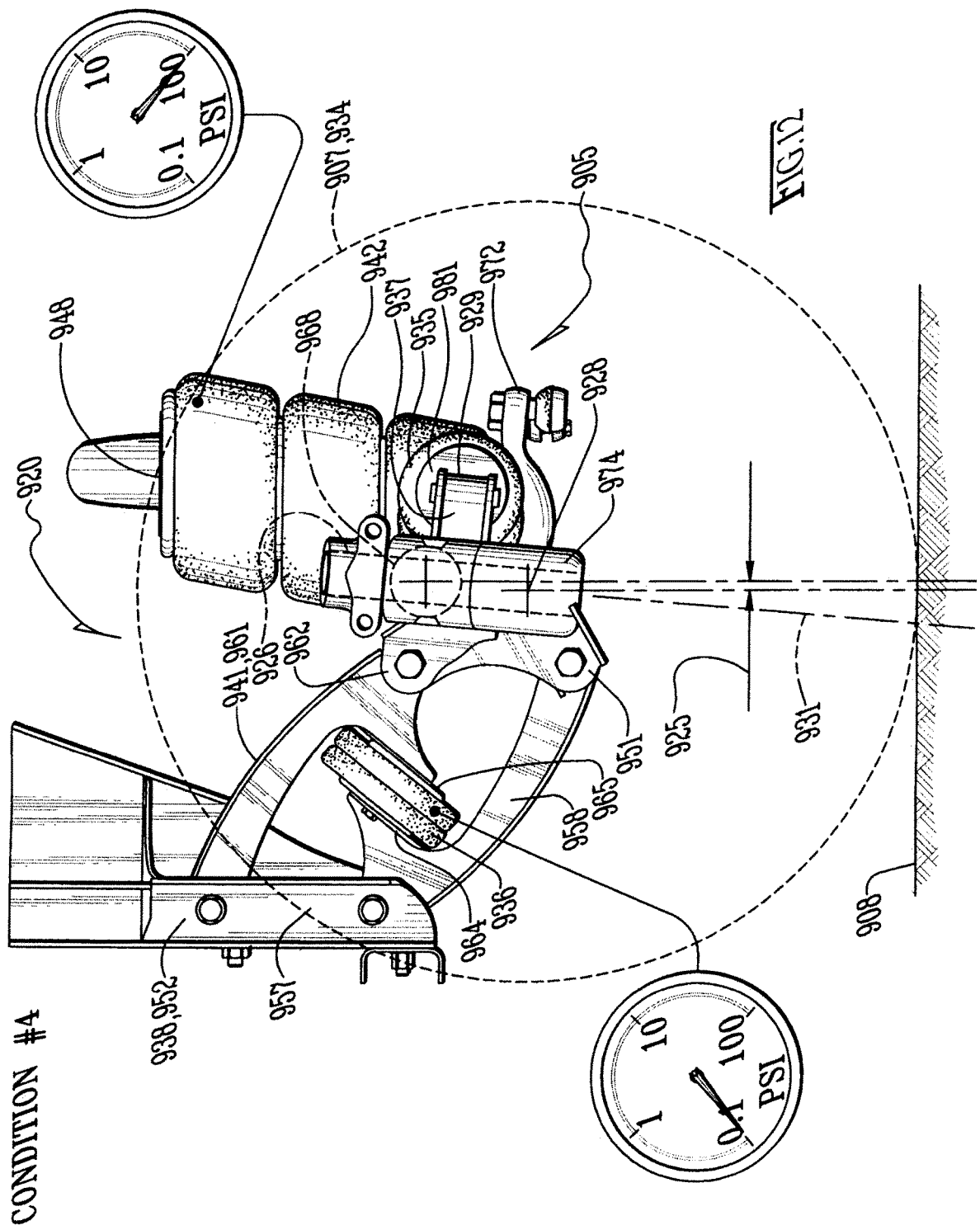
FIG. 12 is a side elevational view of taken in the direction of arrows XII-XII in FIG. 10, and comparable to the side elevational views of FIGS. 6, 8 and 10, still representing Condition No. 4 with regard to the pneumatic system, wherein the load air springs remain pressurized to 100 psi (or some high pressure input) and the lift air springs remain depressurized.

FIG. 12 is a side elevational view of taken in the direction of arrows XII-XII in FIG. 10, and comparable to the side elevational views of FIGS. 6, 8 and 10, still representing Condition No. 4 with regard to the pneumatic system, wherein the load air springs 942 remain pressurized to 100 psi and the lift air springs 936 remain depressurized.

Figure 13:
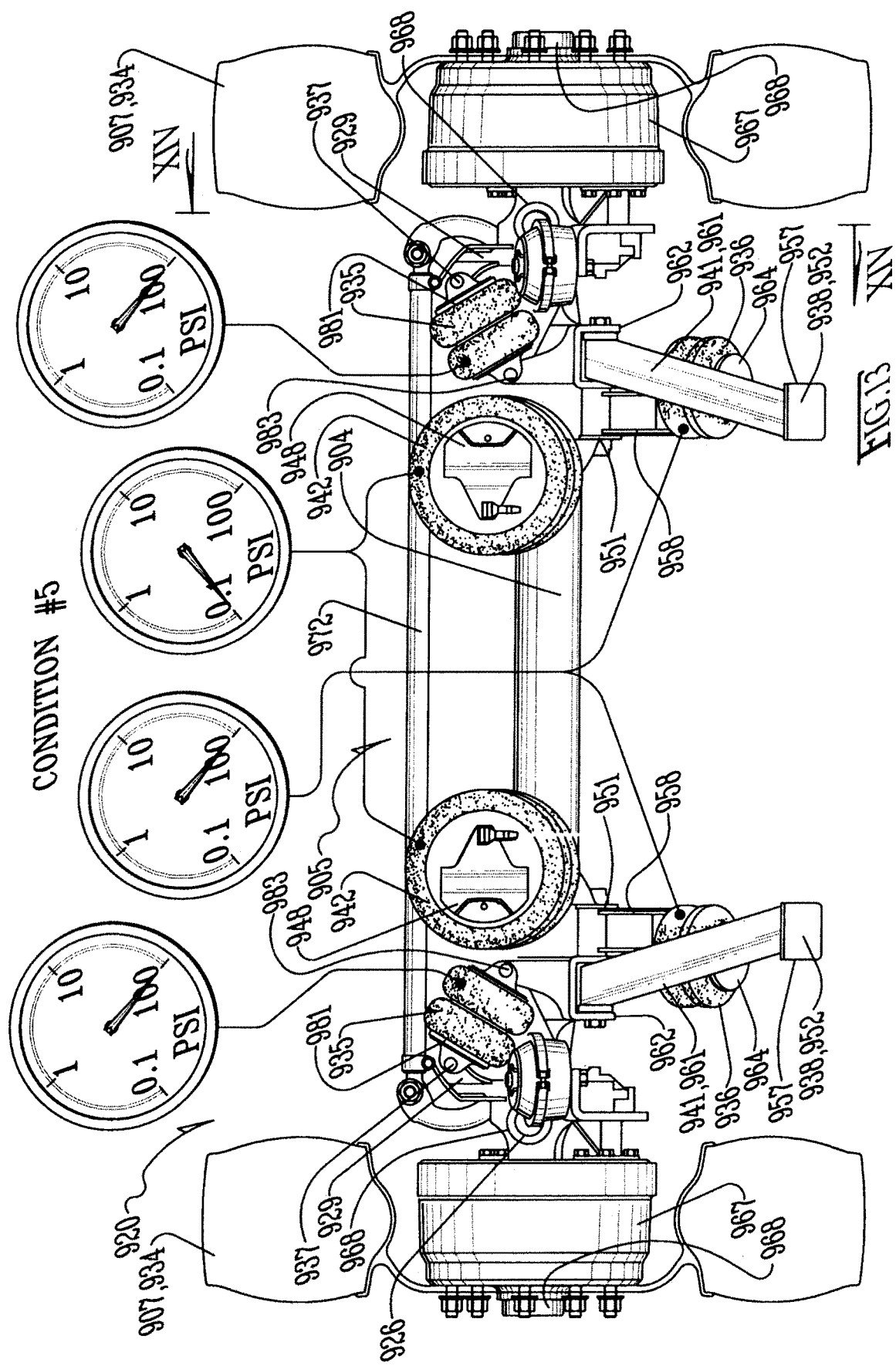
FIG. 13 is a top plan view comparable to FIGS. 5, 7, 9 and 11, representing a Condition No. 5 with regard to the pneumatic system, for example locking out the lift axle in a lifted position, wherein the left and right dampening air spring remain pressurized at 100 psi (or a high pressure input), but now the lift air springs have been pressurized to 100 psi also (or another high pressure input as well) also.

FIG. 13 is a top plan view comparable to FIGS. 5, 7, 9 and 11, representing a Condition No. 5 with regard to the pneumatic system, for example locking out the lift axles 904 in a lifted position, wherein the left and right dampening air spring 935 remain pressurized at 100 psi, but now the lift air springs 936 have been pressurized to 100 psi also.

FIG. 14 is a side elevational view of taken in the direction of arrows XIV-XIV in FIG. 12, and comparable to the side elevational views of FIGS. 6, 8, 10 and 12, still representing Condition No. 5 with regard to the pneumatic system, wherein the load air springs 942 have been depressurized flat whereas the lift air springs 936, as mentioned in connection with FIG. 13, have been pressurized to 100 psi.

Further objects of the invention can be summarized and/or include as follows.

It is an object to provide a suspension system 920 for liftable steerable axles 904 which has the following:

at least one steering knuckle 929;

at least one pistonless bellows air spring actuator (ie., damper air spring 935);

a steerable axle structure 905 that has, at each end, a kingpin housing boss 974, a kingpin 926 fixed into the kingpin boss 974, and a pair of steering knuckles 929 that rotate around the kingpin 926 and are supported by the kingpin housing boss 974;

wherein the steering knuckles 929 are connected at the bottom of each other side to side by a tie rod assembly 972 that respond to each others rotational inputs; and further comprising the damper air spring 935 being connected to the steering knuckle 929 so that, given a supplied pneumatic air force, the damper air spring 935 stabilizes and dampens the steering road inputs when in motion.

The inventors hereof call this Regulated Air Dampening (RAD).

This regulated air can be supplied from a neutral tank supply 944. Or this regulated air can be supplied from a higher pressure suspension load air spring source (eg., the lift or load air springs 936 or 942), if available.

The damper air spring 935 can also have, at its inlet, a biased orifice 984 so that pneumatic air flowing into and out of the damper air spring 935 flows at different rate going into the damper air spring 935 versus coming out of the damper air spring 935. This thereby causes a dampening or dashpot effect to the system.

The damper air spring 935 can be realized as a pair of bellows air spring actuators 935, one each connected to one each steering knuckle 929 on both sides of the steerable axle 904. This would offer an even greater effect of steering dampening to the system.

The damper air spring 935 can be linked into a valve 985 that gets a suspension lift axle 904 signal so that, when lifting up the axle 904, the steering bellows air spring 935 is sent a high pressure so as to force the damper air spring 935 to center straight the steering knuckles 929 and thus centering the axle 90 for in motion while lifted.

This high pressure can be sent directly from a tank 944. Or the high pressure can be can be the same air pressure as used to go to the lift air springs 936 that would be lifting the axle 904 up off the ground.

The damper air spring 935 can be linked into a valve 985 that gets a vehicle 901 backup signal so that, when backing up, the damper air spring 935 is sent a high pressure so as to force the damper air spring 935 to center straight the steering knuckles 929 and thus centering the steerable wheels 907 for backing up.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

What is claimed is:

1. A suspension system for liftable steerable axles adapted for auxiliary axle service under a heavy duty vehicle, comprising:
   at least one damper air spring;
   a steering axle structure that has, at each end, a kingpin housing, a kingpin fixed into the kingpin housing, and a pair of steering knuckles that rotate around the respective kingpin and are supported by the respective kingpin housing;
   wherein the steering knuckles are connected at the bottom of each other side to side by a tie rod assembly so that the pair of steering knuckles respond to each other's rotational inputs; and
   further comprising the damper air spring being connected to the steering knuckle so that, given a supplied pneumatic air force, the damper air spring stabilizes and dampens the steering road inputs when in motion;
   wherein the damper air spring is linked into a valve that gets a suspension lift axle signal so that, when the suspension system for liftable steerable axles is lifting up the axle, the damper air spring is sent a high pressure so as to force the air spring to center straight the steering knuckles whereby thus centering the steering knuckles while lifted.

2. The suspension system of claim 1, wherein:
   the supplied pneumatic air force comprises regulated air supplied from a neutral tank supply or from a higher pressure pistonless bellows suspension load air spring.

3. The suspension system of claim 1, wherein:
   the damper air spring has, at its inlet, a biased orifice so that pneumatic air flowing into and out of the damper air spring flows at different rate going into versus coming out of the damper air spring, thereby causing a dampening or dashpot effect to the system.

4. The suspension system of claim 1, wherein:
   the damper air spring can be realized as a pair of bellows air spring actuators, one each connected to one each steering knuckle on both sides of the steering axle, whereby the damper air spring can be realized as a pair of bellows air spring actuators would offer an even greater effect of steering dampening to the system.

5. The suspension system of claim 1, further comprising:
   a pair of lift air springs for lifting the axle up off the ground;
   wherein the supplied pneumatic air force can be sent directly from a tank or can be the same supplied pneumatic air force as used to go to the lift air springs that would be lifting the axle up off the ground.

6. A suspension system for liftable steerable axles adapted for auxiliary axle service under a heavy duty vehicle, comprising:

at least one damper air spring;
a steering axle structure that has, at each end, a kingpin housing, a kingpin fixed into the kingpin housing, and a pair of steering knuckles that rotate around the respective kingpin and are supported by the respective kingpin housing;
wherein the steering knuckles are connected at the bottom of each other side to side by a tie rod assembly so that the pair of steering knuckles respond to each other's rotational inputs; and
further comprising the damper air spring being connected to the steering knuckle so that, given a supplied pneumatic air force, the damper air spring stabilizes and dampens the steering road inputs when in motion;
wherein the damper air spring is linked into a valve that gets a vehicle backup signal so that, when backing up, the damper air spring is sent a high pressure so as to force the damper air spring to center straight the steering knuckles and thus centering the steering knuckles for backing up.

7. A suspension system for liftable steerable axles adapted for auxiliary axle service under a heavy duty vehicle, comprising:
at least one damper air spring;
a steering axle structure that has, at each end, a kingpin housing, a kingpin fixed into the kingpin housing, and a pair of steering knuckles that rotate around the respective kingpin and are supported by the respective kingpin housing;
wherein the steering knuckles are connected at the bottom of each other side to side by a tie rod assembly so that the pair of steering knuckles respond to each other's rotational inputs; and
further comprising the damper air spring being connected to the steering knuckle so that, given a supplied pneumatic air force, the damper air spring stabilizes and dampens the steering road inputs when in motion;
a pair of laterally-spaced hanger brackets adapted to depend from some portion of the heavy duty vehicle and thereby provide load support;
a pair of laterally spaced trailing arms connected to respective ones of the pair of laterally-spaced hanger brackets and extending rearward to connections at laterally-spaced locations on the steerable axle; and
a pair of laterally-spaced pistonless bellows lift air springs for lifting the steerable axle and thereby lifting the steerable tires off and clear of the pavement or tire-travel ground;
wherein each trailing bracket and respective trailing arm cooperatively comprise a four-bar mechanism and has one of the pistonless bellows lift air springs arranged within the four-bar mechanism such that the pistonless bellows lift air spring's extension stroke is harnessed for lifting service; and
wherein each four-bar mechanism comprises a ground link, an upper and a lower crank link, and a floating link all pivotally connected in a loop;
wherein the ground link comprises a vertical span of the hanger bracket;
the upper and lower crank links are pivoted at a respective base end to the ground link at respectively vertically spaced upper and lower positions;
the floating link is pivotally connected between the distal ends of the upper and lower crank links;
the lower crank link has a rear facing, upwardly extending air-spring seat;
the upper crank has a forward facing, downwardly extending air-spring seat; and
the lift air spring is disposed between respective air-spring seats.

8. A combination of a heavy duty vehicle with at least one steerable axle and a suspension system therefor; comprising:
a heavy duty vehicle having a longitudinal axis;
at least one steerable axle arranged relative the heavy duty vehicle to extend on a lateral axis between left and right ends;
a left and right caster tire which are coupled with the left and right ends respectively of the steerable axle with hardware that allow, when the heavy duty vehicle is moving forward, caster-wheel style passive-following steering for these left and right caster tires of this at least one steerable axle of the heavy duty vehicle;
a suspension system for the at least one steerable axle;
wherein the suspension system comprises laterally-spaced left and right pistonless bellows load suspension air springs coupled between the heavy duty vehicle and steerable axle allowing foreshortening and extension strokes whereby responsive to road-dampening service to generally vertical road inputs;
the suspension system for the at least one steerable axle further comprising:
a four-bar linkage arrangement that incorporates in part a given span of the steerable axle and which provides anti-fluttering service whereby to improve performance of the caster tires of the at least one steerable axle of the heavy duty vehicle;
the four-bar linkage arrangement comprising a ground link, a pair of crank links, and a driven link;
wherein:
the ground link comprises the given span of the steerable axle;
the crank links comprise links extending between a proximal end pivotally coupled to the steerable axle and distal ends; and
the driven link extends laterally between left and right pivot connections with the left and right crank links respectively;
wherein the four-bar linkage arrangement further comprises left and right pistonless bellows dampening air springs for dampening out characteristic left and right fluttering of the caster tires in clockwise and counter-clockwise oscillations when the heavy duty vehicle is moving forward.

9. The combination of claim 8, wherein:
each dampening air spring has, at or proximate a port therefor, a biased orifice so that pneumatic air flowing into and out of the dampening air spring flows at different rate going into versus coming out of the dampening air spring, thereby causing a dampening or dashpot effect to the system.

10. The combination of claim 8, wherein:
the dampening air spring is linked into a valve that gets a vehicle backup signal so that, when backing up, the dampening air spring is sent a high pressure so as to force the dampening air spring to center straight the steering knuckles and thus centering the caster tires for backing up.

11. The combination of claim 8, further comprising:
a pair of laterally-spaced hanger brackets adapted to depend from some portion of the heavy duty vehicle and thereby provide load support;
a pair of laterally spaced trailing arms connected to respective ones of the pair of laterally-spaced hanger brackets and extending rearward to connections at laterally-spaced locations on the steerable axle; and a pair of laterally-spaced pistonless bellows lift air springs for lifting the steerable axle and thereby lifting the steerable tires off and clear of the pavement or tire-travel ground;

wherein each trailing bracket and respective trailing arm cooperatively comprise a four-bar mechanism and has one of the pistonless bellows lift air springs arranged within the four-bar mechanism such that the pistonless bellows lift air spring's extension stroke is harnessed for lifting service.

12. The combination of claim 11, wherein:

the dampening air springs are linked into a valve that gets a suspension lift axle signal so that, when lifting up the steerable axle, the dampening air springs are sent a high pressure so as to force the dampening air springs to center straight the caster tires while lifted.

13. The combination of claim 12, wherein:

the high pressure can be sent directly from a tank or can be the same air pressure as used to go to the lift air springs that would be lifting the axle up off the ground.

14. The combination of claim 11, wherein:

each four-bar mechanism comprises a ground link, an upper and a lower crank link, and a floating link all pivotally connected in a loop;

wherein the ground link comprises a vertical span of the hanger bracket;

the upper and lower crank links are pivoted at a respective base end to the ground link at respectively vertically spaced upper and lower positions;

the floating link is pivotally connected between the distal ends of the upper and lower crank links;

the lower crank link has a rear facing, upwardly extending air-spring seat;

the upper crank has a forward facing, downwardly extending air-spring seat; and the lift air spring is disposed between respective air-spring seats.

15. A suspension system for liftable steerable axles adapted for auxiliary axle service under a heavy duty vehicle, comprising:

at least one steerable axle arranged relative to a longitudinal axis of a heavy duty vehicle to extend on a lateral axis between left and right ends;

a left and right caster tire which are coupled with the left and right ends respectively of the steerable axle with hardware that allow, when the heavy duty vehicle is moving forward, caster-wheel style passive-following steering for these left and right caster tires of this at least one steerable axle of the heavy duty vehicle;

the hardware for the at least one steerable axle further comprising:

a left and right pivotal link pivotally connected intermediate the at least one steerable axle and the left and right caster tires whereby allowing clockwise and counter-clockwise turning of the left and right caster tires;

said suspension system for liftable steerable axles further comprising at least one pistonless bellows dampening air spring operatively connected between the at least one steerable axle and one of the left or right pivotal links for dampening out characteristic left and right fluttering of the caster tires in clockwise and counter-clockwise oscillations when the heavy duty vehicle is moving forward.

16. The suspension system of claim 15, further comprising:

a pair of laterally-spaced hanger brackets adapted to depend from some portion of the heavy duty vehicle and thereby provide load support;

a pair of laterally spaced trailing arms connected to respective ones of the pair of laterally-spaced hanger brackets and extending rearward to connections at laterally-spaced locations on the steerable axle; and a pair of laterally-spaced pistonless bellows lift air springs for lifting the steerable axle and thereby lifting the steerable tires off and clear of the pavement or tire-travel ground;

wherein each trailing bracket and respective trailing arm cooperatively comprise a four-bar mechanism and has one of the pistonless bellows lift air springs arranged within the four-bar mechanism such that the pistonless bellows lift air spring's extension stroke is harnessed for lifting service.

17. The suspension system of claim 16, wherein:

the dampening air spring is linked into a valve that gets a suspension lift axle signal so that, when lifting up the steerable axle, the dampening air spring is sent a pressure so as to force the dampening air spring to center straight the caster tires while lifted.

18. The suspension system of claim 15, wherein:

the dampening air spring has, at or proximate a port therefor, a biased orifice so that pneumatic air flowing into and out of the dampening air spring flows at different rate going into versus coming out of the dampening air spring, thereby causing a dampening or dashpot effect to the system.

\* \* \* \* \*